(12) United States Patent
Weis et al.

(10) Patent No.: US 9,364,129 B2
(45) Date of Patent: Jun. 14, 2016

(54) DRIVE SYSTEM FOR A CLEANING UNIT, AND CLEANING UNIT

(75) Inventors: Norbert Weis, Weinheim (DE); Johannes Flath, Viernheim (DE); Karl-Ludwig Gibis, Lumburgerhof (DE)

(73) Assignee: Carl Freudenberg KG, Weinheim (DE)

( * ) Notice: Subject to any disclaimer, the term of this patent is extended or adjusted under 35 U.S.C. 154(b) by 569 days.

(21) Appl. No.: 13/822,687

(22) PCT Filed: Aug. 23, 2011

(86) PCT No.: PCT/EP2011/004222
§ 371 (c)(1),
(2), (4) Date: Apr. 10, 2013

(87) PCT Pub. No.: WO2012/034634
PCT Pub. Date: Mar. 22, 2012

(65) Prior Publication Data
US 2013/0192019 A1  Aug. 1, 2013

(30) Foreign Application Priority Data
Sep. 13, 2010 (DE) .......................... 10 2010 045 096

(51) Int. Cl.
*A47L 11/40* (2006.01)
*A47L 11/32* (2006.01)
*B60K 1/00* (2006.01)

(52) U.S. Cl.
CPC .............. *A47L 11/4063* (2013.01); *A47L 11/32* (2013.01); *A47L 11/4066* (2013.01); *A47L 11/4069* (2013.01); *A47L 2201/00* (2013.01); *B60K 2001/001* (2013.01)

(58) Field of Classification Search
CPC ..... A47L 11/00; A47L 11/4069; A47L 11/24; A47L 11/4066; A47L 11/4063; A47L 2201/00; E04H 4/16
USPC .......................................... 15/49.1, 319, 340
See application file for complete search history.

(56) References Cited

U.S. PATENT DOCUMENTS

| 1,869,179 | A | * | 7/1932 | Yutzler | ................. | A47L 11/164 |
| | | | | | | 15/180 |
| 1,995,685 | A | * | 3/1935 | Perkins | .................... | A47L 11/38 |
| | | | | | | 15/104.002 |
| 4,097,950 | A | * | 7/1978 | Satterfield | ............... | A47L 11/16 |
| | | | | | | 15/385 |

(Continued)

FOREIGN PATENT DOCUMENTS

| DE | 18 13 880 A1 | 7/1970 |
| GB | 2038615 A | 7/1980 |

(Continued)

*Primary Examiner* — Michael Jennings
(74) *Attorney, Agent, or Firm* — Leydig, Voit & Mayer, Ltd.

(57) ABSTRACT

The invention relates to a drive system (1) for driving an automatic cleaning unit, comprising: —a carrier unit (7, 10); —a drive motor (2), which is fastened on the carrier unit (7, 10); —a driveshaft (4), which is arranged in a rotatable manner on the carrier unit (7, 10) and can be driven by the drive motor (2); —an advancement device (15), which is arranged on the driveshaft (4) and can be rotated about the driveshaft, wherein the advancement device (15) is coupled to the driveshaft (4) in order to generate advancement transversely to the extent of the driveshaft (4) and in order, when advancement is stopped, to cause the advancement device (15) to rotate in relation to the carrier unit.

13 Claims, 3 Drawing Sheets

(56) References Cited

U.S. PATENT DOCUMENTS

| | | | |
|---|---|---|---|
| 4,173,809 A | | 11/1979 | Ku |
| 5,634,237 A | * | 6/1997 | Paranjpe .............. A47L 11/4011 15/319 |
| 5,771,987 A | * | 6/1998 | Marbach ................ E04H 4/1654 180/6.66 |
| 6,571,415 B2 | * | 6/2003 | Gerber .................... A47L 11/10 15/49.1 |
| 7,134,160 B2 | * | 11/2006 | Tawara ................... A47L 11/33 15/41.1 |
| 2004/0255425 A1 | | 12/2004 | Arai et al. |
| 2007/0107149 A1 | * | 5/2007 | Kaleta ..................... A47L 11/32 15/42 |
| 2009/0126143 A1 | * | 5/2009 | Haegermarck ............ A47L 9/00 15/319 |
| 2009/0277476 A1 | * | 11/2009 | Hammond ............... A47L 9/009 134/18 |

FOREIGN PATENT DOCUMENTS

| | | | |
|---|---|---|---|
| GB | 2 411 820 A | | 9/2005 |
| WO | WO 9528868 A1 | * | 11/1995 ............ A47L 11/282 |
| WO | WO-2007008148 A1 | | 1/2007 |

\* cited by examiner

DRIVE SYSTEM FOR A CLEANING UNIT, AND CLEANING UNIT

CROSS-REFERENCE TO RELATED APPLICATIONS

This patent application is the national phase of PCT/EP2011/004222, filed Aug. 23, 2011 which claims the benefit of German Patent Application No. 10 2010 045 096.0, filed Sep. 13, 2010.

FIELD OF THE INVENTION

The present invention pertains to drive systems for automatic cleaning units and for cleaning units that clean a surface by sweeping the surface over which the cleaning unit passes.

BACKGROUND OF THE INVENTION

Cleaning units for cleaning floors are generally known. As a rule, these units include a rotating roll, for example, with a brush attachment. The roll, in addition to moving the cleaning unit across a floor surface, also rotates so as to sweep a floor surface with the brush attachment. This type of cleaning unit is frequently operated by hand. Improvements in battery technologies make it increasingly possible to manufacture automatic cleaning units that pass over a floor surface in random movements and thus clean the floor surface.

As a rule, automatic cleaning units run in a straight line across an area of the floor surface until they encounter an obstacle. After contact with the obstacle, they change direction, which as a rule is done randomly, and the cleaning unit continues to move in a different direction.

For example, U.S. Pat. No. 4,173,809 discloses a battery-operated vacuum cleaner, the drive unit of which includes spherical shells that can rotate in any direction and that can randomly change their movement in any direction.

In addition, U.S. Pat. No. 6,571,415 B2 discloses a floor cleaning system having its own drive mechanism, in which the drive unit includes a hollow spherical shell that is attached to the frame so as to rotate freely. Disposed inside the hollow spherical shell is a weighted motor which randomly moves the hollow spherical shell. This causes the cleaning system to move in random movements across the floor, thereby cleaning the floor surface.

Because of the spherical drive elements, the drive units for the cleaning systems described above have only one or few points of contact with the floor surface, which limits the transmission of the motive energy required to move the cleaning system forward. This is a disadvantage especially in cases where the cleaning system uses a cleaning cloth or a cleaning brush that is intended to have full-surface contact with the floor surface to be cleaned and therefore requires a high driving power in order to set the cleaning system into motion.

Furthermore, in addition to the driving power required to move the cleaning system across the floor surface, it is desirable for a cleaning element that is moved across the floor surface to execute an additional movement, for example, a rotational movement, so as to enhance the cleaning effect.

SUMMARY OF THE INVENTION

Thus, a general object of the present invention is to provide a drive system for a cleaning unit as well as a cleaning unit that allows sufficiently high driving power to be transmitted to the floor surface so as to move a cleaning element for cleaning dirty floors. An additional object of the present invention is to have the cleaning element execute a movement in addition to the forward propelling movement, so as to enhance the cleaning effect.

A first aspect of the invention may pertain to a drive system for driving an automatic cleaning unit. The drive system includes:
  a carrier unit;
  a drive motor that is attached to the carrier unit;
  a drive shaft that is rotatably disposed on the carrier unit and that is driven by the drive motor; and
  a forward propelling unit that is disposed on the drive shaft and that is able to rotate about the drive shaft, with the forward propelling unit being connected to the drive shaft so as to generate a forward propelling movement at right angles relative to the direction of the drive shaft and to cause the forward propelling unit to rotate relative to the carrier unit when the forward propelling movement is obstructed.

The idea behind the drive system described above is to provide a drive motor that is disposed on a carrier unit that, relative to a forward propelling unit, is able to rotate about a drive shaft. The drive motor is drivably coupled to the drive shaft. In addition, the drive shaft is connected, e.g., via a gear unit, to one or a plurality of drive rolls. The one or more drive rolls have a driving axle which runs perpendicular to the drive shaft. The one or more drive rolls generate the forward propelling movement, with the driving axle moving in unison with the drive shaft.

A forward propelling movement is generated by the drive system whenever the rotational movement of the carrier unit meets resistance, such as is generally the case when the carrier unit supports, e.g., a cleaning element that rests upon the floor surface to be cleaned and thus produces a frictional contact. This causes, e.g., the one or more drive rolls to be driven, thereby moving the cleaning unit in a translational movement across the floor surface. Due to the fact that the cleaning element rests upon the floor surface, the frictional force also acts against the forward propelling unit. As a result, the carrier unit that is coupled to the drive shaft is rotated about the drive shaft, and thus the cleaning element is moved in a rotational movement across the floor surface to be cleaned.

When the translational movement across the floor surface is obstructed or blocked, the forward propelling unit is rotated relative to the carrier system, which changes the direction of the subsequently following forward propelling movement, and the cleaning unit that is operated by the drive system continues to move in a different random direction.

Because of the fact that the permissible frictional force of the cleaning element acting upon the floor surface is higher than that known from the prior art, the use of such a drive system for cleaning units leads to a markedly higher cleaning effect. In addition, the navigation around obstacles is considerably smoother, which overall increases the cleaning surface swept within a specific period of time. The coupled drive system in which the rotational movement and the forward propelling movement are coupled to each other via the drive system makes it possible for the cleaning unit to make closer contact with, and move for a longer period of time along, obstacles and edges. Thus, cleaning of these critical areas of a floor surface is improved.

The carrier unit can also support a mounting element that encloses the forward propelling unit and to which a cleaning element, in particular a cleaning cloth and/or a cleaning brush, can be attached.

The carrier unit can be constructed so as to be able to rotate the cleaning element about the forward propelling unit whenever the forward propelling unit generates a forward propelling movement.

In particular, the forward propelling unit can be coupled to the drive shaft in such a manner that the forward propelling unit begins to rotate as soon as the forward propelling movement is obstructed beyond a certain threshold value.

The drive shaft can be coupled to a damper element, with the damper element having a damping capacity that makes it possible to set a predetermined distribution of the motive energy provided by the drive motor between a rotational movement of the carrier unit and the forward propelling movement.

The forward propelling unit can have a minimum of one drive roll that is disposed on a driving axle that is coupled to the drive shaft, with the driving axle running at right angles relative to the drive shaft and being coupled to said drive shaft via a gear unit.

In addition, the forward propelling unit can comprise a minimum of one auxiliary roll that is disposed on the base unit so as to be laterally offset relative to the driving axle, with the axis of rotation of the auxiliary roll running substantially parallel to the driving axle. This ensures more stable straight line travel and an increase in the friction of the forward propelling unit so as to prevent rotation; in this manner, the auxiliary roll makes it possible to adjust the distribution of the motive energy of the drive system between the forward propelling movement and the rotational movement of the carrier unit.

A second aspect of the present invention pertains to a cleaning unit with the drive system described above. The drive system can be enclosed in a housing that, in the direction of the drive shaft, is preferably connected in a spring-loaded manner to the drive system. The spring-loaded connection ensures that whenever pressure is exerted on the housing from above, the pressure does not act directly on the forward propelling unit. Instead, the force is absorbed by the housing, especially when the housing makes contact with the floor surface before the spring has reached the end of its travel path.

In addition, the shape of the housing can be noncircular relative to a plane parallel to the plane of the forward propelling movement of the forward propelling unit. This reliably ensures that a rotation of the housing is blocked when the cleaning unit encounters an obstacle so that the rotation of the forward propelling unit starts immediately.

The carrier unit can be in the form of a mounting element, in particular a mounting ring, that is disposed parallel to the plane of the forward propelling movement of the forward propelling unit.

The mounting element can have a mechanism for attaching a cleaning element, in particular for creating a hook and loop fastener for connection to the cleaning element.

In addition, the mounting element can be surrounded by a weighting element so as to push an attached cleaning element against a floor surface.

According to one embodiment of the invention, the mounting element can be constructed so as to be able to rotate about the housing.

In addition, the cleaning unit can include a control unit for controlling the direction of rotation of the drive motor. The control unit can be constructed so as to reverse the drive motor at specific time intervals or via manual operation. This improves the cleaning coverage of complex rooms and makes it easier to maneuver out of narrow spaces and to remove obstacles.

According to one embodiment of the invention, the control unit can be constructed so as to reverse the direction of rotation of the drive motor as soon as it is determined that the translational and rotational movement of the forward propelling unit is completely blocked. In this manner, it is possible to more readily resolve situations in which the movement is blocked.

BRIEF DESCRIPTION OF THE SEVERAL VIEWS OF THE DRAWINGS

Preferred embodiments of the invention will be described in greater detail below with reference to the attached drawings. As can be seen.

DETAILED DESCRIPTION OF THE INVENTION

Figure 1:
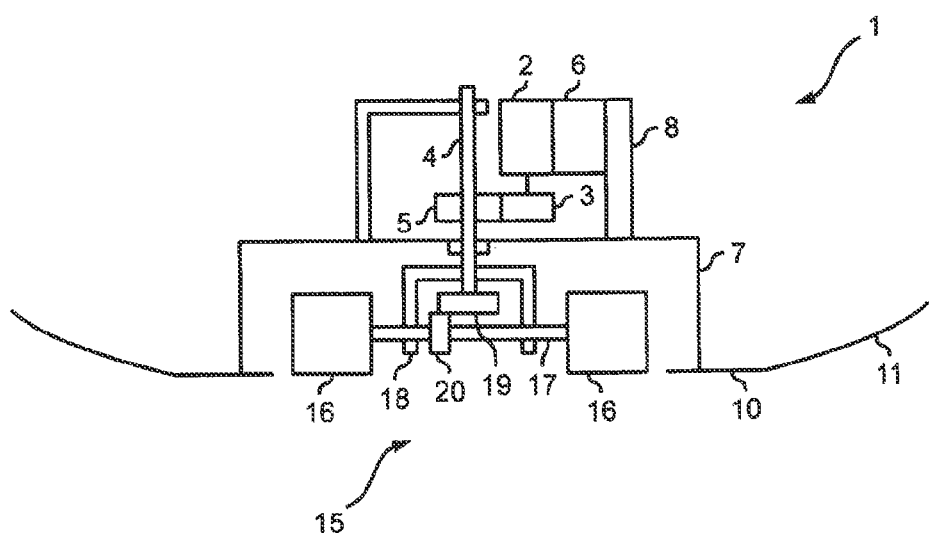
FIG. 1 is a schematic side view of an exemplary drive system for a cleaning unit.

FIG. 1 provides a schematic view of a drive system 1 for operating a cleaning unit. The drive system 1 includes a drive unit 2, for example, in the form of an electric motor. To power the electric motor 2, it is supplied with electric power by a power storage unit 6.

The electric motor 2 is coupled to a drive shaft 4 via a gear unit such that the electric motor 2 drives the drive shaft. For use in a cleaning unit, the drive shaft 4 is disposed substantially perpendicular relative to the floor surface to be cleaned by the cleaning unit. To this end, the electric motor 2 can include, in particular, a drive shaft with a pinion 3, by means of which the drive shaft 4 is driven. To transmit the input torque to the drive shaft 4, the drive shaft 4 can have a gear wheel 5 that engages the pinion 3.

In addition, the drive system can include a base unit 7 to which the electric motor 2 and the power storage unit 6 are connected, for example, via a mount 8. In addition, the base unit 7 serves to hold the drive shaft 4 substantially in a vertical position with the drive shaft 4 mounted so as to be torsionally movable relative to the base unit 7. The drive shaft 4 is preferably mounted on two points of support arranged at a distance from each other.

The base unit 7 is rigidly connected to a mounting ring 10 that constitutes the carrier unit and that, when used in the cleaning unit, rests close upon the floor and is disposed substantially parallel to the floor surface. The mounting ring 10 serves to hold a cleaning element in the form of a cleaning cloth, a cleaning brush or the like. The cleaning element can preferably be detachably connected to the mounting ring 10, for example, by means of a hook and loop fastener, and is thus replaceable. To ensure that, if a cleaning cloth is used, the cleaning cloth is in contact with the largest possible surface of the floor surface, a flexible weighting element 11 can be disposed along the outside circumference of the mounting ring 10, with the weighting element 11 substantially surrounding the mounting ring 10 in the form of a ring.

The cleaning cloth that can be attached to the mounting ring 10 preferably has the shape of a ring as well. The cleaning cloth can have an outside diameter equal to or larger than the outside diameter of the weighting element and an inside diameter that is substantially identical to the inside diameter of the mounting ring 10. When placed onto the floor surface, the cleaning cloth is in full-surface contact with the floor surface. The inside edge of the cloth is pushed by the mounting ring 10, and the outside edge by the weighting element 11, against the floor surface.

Disposed in the inside area that is surrounded by the mounting ring 10 is a forward propelling unit 15 with two drive rolls 16 that are rigidly connected to each other by a driving axle 17. The drive rolls 16 preferably have the form of cylinders and are made of a material, e.g., rubber, that has high friction with conventional floor surfaces to be cleaned. In addition, to further increase the friction, the drive rolls can have grooves that run at right angles relative to the circumferential direction. An axle mounting unit 18 holds the driving axle 17 in a horizontal position and substantially perpendicular to the drive shaft 4. To this end, the axle mounting unit 18 is disposed on the drive shaft 4, thus ensuring that although the drive shaft is able to rotate independently of the axle mounting unit 18, the axle mounting unit 18 locks the axle 17 in a position at a right angle relative to the drive shaft 4.

A gear rim 19 is disposed on the end of the drive shaft 4 that faces the forward propelling unit 15. The gear rim 19 engages a gear wheel 20 that is rigidly disposed on the driving axle 17. This arrangement enables a rotation of the drive shaft 4 to translate into a rotation of the driving axle 17. Thus, a rotation of the drive shaft 4 leads to a rotation of the driving axle 17 and, as a result, to a forward propelling movement via the drive rolls 16.

Because of the drive system 1 described above, the motive energy provided by the electric motor 2 and transmitted via the drive shaft 4 is distributed between the forward propelling movement caused by the drive rolls 16 and a rotational movement of the base unit 7 above the floor surface on which the drive system and the drive rolls 16 rest. This enables a cleaning element that is disposed on the mounting ring 10 to rotate about the forward propelling unit 15.

When properly adjusted, if, for example, the cleaning element is a cleaning cloth with which a smooth surface, such as parquet, laminate, tile or stone or the like, is to be cleaned, the use of the drive system above leads to a forward propelling movement caused by the rotation of the drive rolls 16 and, at the same time, to a rotation of the mounting ring 10 about the forward propelling unit 15 so that an attached cleaning cloth is able to rotate about the drive shaft 4.

When a cleaning unit operated by this drive system 1 encounters an obstacle, first the rotation of the base unit 7 with the mounting ring 10 is obstructed or blocked, and the motive energy that had previously been transmitted via the drive shaft 4 to the mounting ring 10 is now completely transmitted to the forward propelling unit 15. If the obstacle also blocks the rotation of the drive rolls 16, which preferably have high friction with the floor surface, the motive energy on the drive shaft 4 is translated against the frictional force of the drive rolls 16 on the floor surface into a rotational movement of the forward propelling unit 15 about the drive shaft 4. The power necessary to cause the forward propelling unit 15 to rotate is high since during the rotational movement, a minimum of one of the drive rolls 16 is moved across the floor surface against the frictional resistance, and thus a rotation of the forward propelling unit 15 preferably takes place only when both the forward propelling movement and the rotational movement of the base unit 7 and its attached mounting ring 10 are blocked.

The rotational movement of the forward propelling unit continues as long as the forward propelling movement is obstructed. As soon as the cleaning unit is free to move again because of the changed forward propelling direction and the drive rolls 16 of the forward propelling unit 15 again generate a forward propelling movement of the drive system 1, the forward propelling unit 15 stops rotating. In other words, the rotation of the forward propelling unit 15 continues until a portion of the motive energy leads either to a rotational movement of the base unit 7 and the cleaning element attached thereto and/or to a forward propelling movement via the drive rolls 16. As soon as a specific minimum portion of the motive energy is again translated into a forward propelling movement or is used to rotate the cleaning elements, the motive energy is no longer sufficient to cause the forward propelling unit 15 to rotate on the floor surface and the rotation of the forward propelling unit 15 on the floor surface stops as a result of the high frictional force of the drive rolls 16. Subsequently, the drive system 1 moves the cleaning unit substantially in a straight line in a new direction that is determined by the direction in which the forward propelling unit 15 faces at the time when the forward propelling unit 15 stops rotating.

Figure 2:
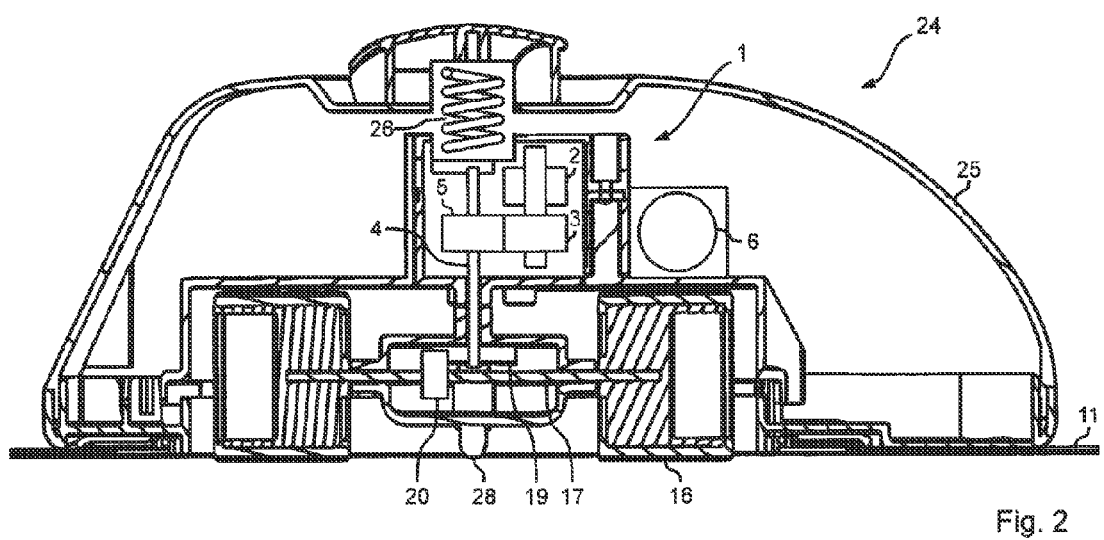
FIG. 2 is a side sectional view of an embodiment of a cleaning unit for sweeping a floor surface.

FIG. 2 shows a cross section through a cleaning unit with the drive system 1 along the perpendicularly disposed drive shaft 4. As illustrated, the drive unit 1 is disposed in a housing 25 that encloses the drive unit 1.

The housing 25 is connected in a substantially spring-loaded manner to the drive unit 1 so that any pressure on the outside of the housing 25 causes the housing 25 to be lowered to the floor surface, without the pressure being directly exerted on the drive rolls 16 by the drive unit 1. As a result, the drive unit 1 is protected against any impact on the housing 25. The housing 25 is connected by a minimum of one spring 26 to the drive unit 1.

Figure 3:
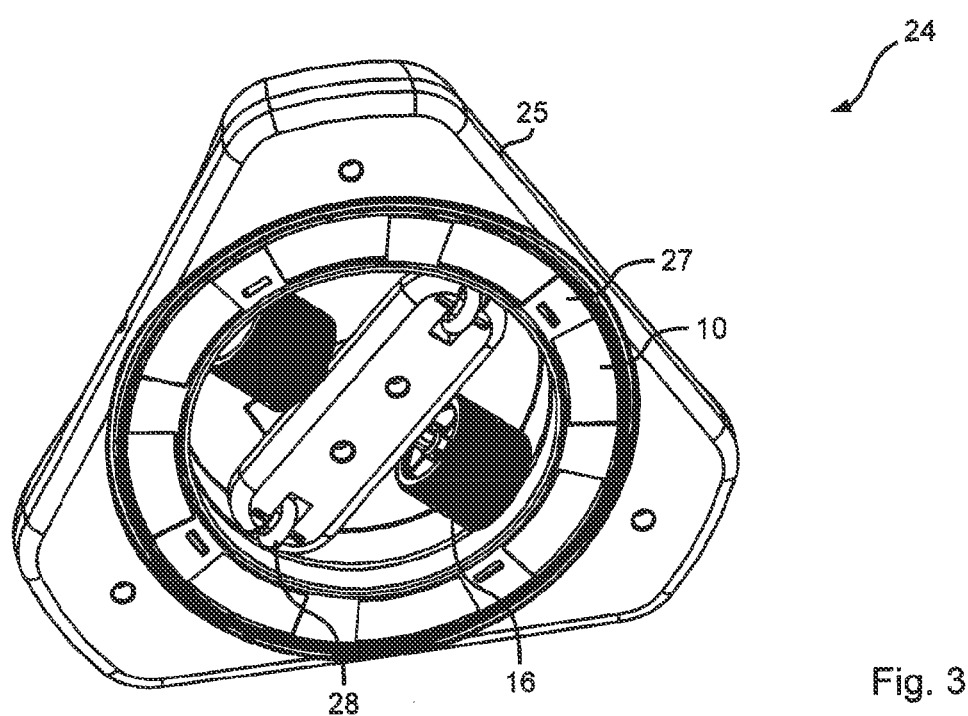
FIG. 3 is a perspective view showing the bottom of the cleaning unit of FIG. 2.

In addition, the housing 25 is coupled to the base unit 7 in such a manner that when the base unit 7 rotates on the floor surface, the housing 25 also rotates, i.e., the housing is carried along by the base unit 7 of the drive system 1. As illustrated in FIG. 3, the shape of the housing 25 is noncircular, so that the moment the unit meets an obstacle, the rotational movement of the housing 25, and thus of the base unit 7 connected thereto, is obstructed, and friction between the outside rim of the housing 25 and the blocking object is avoided as much as possible. The immediate blockage of the rotational movement of the housing 25 subsequently leads to a rotation of the driving axle 17 between the two drive rolls 16, which causes the cleaning unit 24 to change direction until it encounters another obstacle.

FIG. 3 shows the bottom of the cleaning unit 24 and the mounting ring 10 to which the cleaning element, for example, a cleaning cloth or the like, is attached. The cleaning element can be attached, for example, by hook and loop fasteners, with the illustrated embodiment having hoop and loop tapes 27 that are arranged at certain spaced intervals from one another on the mounting ring 10.

In addition, the forward propelling unit 15 of the cleaning unit 24 shown in FIG. 3 can include one or more auxiliary wheels 28 that are disposed at a distance from the drive rolls 16 in a direction perpendicular to the driving axle 17 and that have an axis of rotation parallel to the drive rolls 16. The auxiliary wheels 28 are disposed relative to the drive rolls 16 such that the bottom surface of the auxiliary wheels is on approximately the same level as the bottom surface of the drive rolls 16.

The auxiliary wheels 28 serve to improve straight line travel of the forward propelling unit 15 and to increase the resistance of the forward propelling unit 15 to rotation so that a larger portion of the energy of rotation is transmitted to the base unit 7 and to the housing 25. When the forward propelling unit 15 rotates, the one or more auxiliary wheels 28 are moved across the floor surface at a right angle relative to their direction of travel. However, the auxiliary wheels 28 can also be pushed by spring loading against the floor surface, with the spring force being adjustable so as to regulate the reaction of the cleaning unit 24 when it meets an obstacle.

As an alternative or in addition thereto, the rotatability of the forward propelling unit can also be controlled through the selection of the material of the drive rolls 16 and/or through the selection of the size of the bottom surfaces of the drive rolls 16, which surfaces determine the friction of the drive rolls 16 on the floor surface. In this manner, it is possible to determine the resistance of the forward propelling unit to a rotational movement.

According to another embodiment of the invention, a damper element can be disposed between the forward propelling unit 15 and the base unit 7 so as to influence the portion of the motive energy transmitted during a rotation of the base unit 7. The damper element 29 can be variable with respect to the relative angle between the forward propelling unit 15 and the base unit 7, thus making it possible to set preferred directions of the forward propelling unit 15 relative to the housing 25 as well as the speed of rotation of the base unit.

In an alternative embodiment, the housing 25 is constructed so as to be able to rotate about the base unit of the drive system 1. In this case, the cleaning element does not rotate when the cleaning unit is in motion.

In addition, the cleaning unit 24 can include a control unit for controlling a direction of rotation of the drive motor 2. The control unit can be constructed so as to reverse the drive motor 2 at specific time intervals or by manual operation. This ensures that the cleaning coverage of complex rooms is improved and that it is easier to maneuver the cleaning unit 24 out of narrow spaces and to remove obstacles.

In addition, as soon as it is determined that the translational and rotational movement of the forward propelling unit 15 is completely blocked, the direction of rotation of the drive motor 2 can be reversed, thus allowing situations in which the movement is blocked to be more readily resolved. A complete blockage of the translational and rotational movement can be detected, for example, by monitoring the motor current or by suitable motion sensors.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to he practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A drive system for driving an automatic cleaning unit, the drive system comprising:
    a carrier unit; a drive motor attached to the carrier unit; a drive shaft rotatably disposed on the carrier unit and drivable by the drive motor;
    a forward propelling unit disposed on the drive shaft and rotatable about the drive shaft through a driving axle that is coupled to the drive shaft through a gear unit; and
    a cleaning element; wherein the forward propelling unit is coupled to the drive shaft so as to generate a forward propelling movement in perpendicular relation to a longitudinal direction of the drive shaft and to cause the forward propelling unit to rotate relative to the carrier unit whenever the forward propelling movement is obstructed;
    wherein the carrier unit supports a mounting element that encloses the forward propelling unit;
    wherein the cleaning element is attachable to the mounting element; and wherein the carrier unit is constructed so as to rotate the cleaning element about the forward propelling unit when the forward propelling unit generates the forward propelling movement.

2. The drive system as in claim 1, wherein the forward propelling unit is coupled to the drive shaft in such a manner that the rotation of the forward propelling unit is initiated when the forward propelling movement is obstructed beyond a certain threshold value.

3. The drive system as in claim 1, wherein the drive shaft is coupled to a damper element, the damper element having a damping capacity to enable setting of a predetermined distribution of a motive energy provided by the drive motor between rotation of the carrier unit and the forward propelling movement.

4. The drive system as in claim 1, wherein the forward propelling unit comprises at least one drive roll that is disposed on the driving axle.

5. The drive system as in claim 4, wherein the forward propelling unit comprises at least one auxiliary roll that is disposed so as to be laterally offset relative to the driving axle, the auxiliary roll having an axis of rotation of the auxiliary roll that extends substantially parallel to the driving axle.

6. A cleaning unit comprising:
    a drive system including:
    a carrier unit;
    a drive motor attached to the carrier unit;
    a drive shaft rotatably disposed on the carrier unit and drivable by the drive motor;
    a forward propelling unit disposed on the drive shaft and rotatable about the drive shaft through a driving axle that is coupled to the drive shaft by a gear unit; and
    a cleaning element;
    wherein the forward propelling unit is coupled to the drive shaft so as to generate a forward propelling movement in perpendicular relation to a longitudinal direction of the drive shaft and to cause the forward propelling unit to rotate relative to the carrier unit whenever the forward propelling movement is obstructed;
    wherein the carrier unit supports a mounting element that encloses the forward propelling unit;

wherein the cleaning element is attached to the mounting element; and wherein the carrier unit is constructed so as to rotate the cleaning element about the forward propelling unit when the forward propelling unit generates the forward propelling movement.

7. The cleaning unit as in claim 6, wherein the drive system is enclosed in a housing that is connected in a spring-loaded manner to the drive system in the longitudinal direction of the drive shaft.

8. The cleaning unit as in claim 7, wherein the housing has a noncircular shape relative to a plane parallel to a plane of the forward propelling movement of the forward propelling unit.

9. The cleaning unit as in claim 7, wherein the carrier unit is constructed so as to be rotatable about the housing.

10. The cleaning unit as in claim 6, wherein the mounting element is disposed parallel to a plane of the forward propelling movement of the forward propelling unit.

11. The cleaning unit as in claim 10, wherein the mounting element is surrounded by a weighting element so as to push an attached cleaning element onto a floor surface.

12. The cleaning unit as in claim 6, further comprising a control unit for controlling a direction of rotation of the drive motor, wherein the control unit is constructed so as to reverse the drive motor.

13. The cleaning unit as in claim 12, wherein the control unit is constructed so as to reverse the direction of rotation of the drive motor when translational and rotational movement of the forward propelling unit is completely blocked.

* * * * *